UNITED STATES PATENT OFFICE.

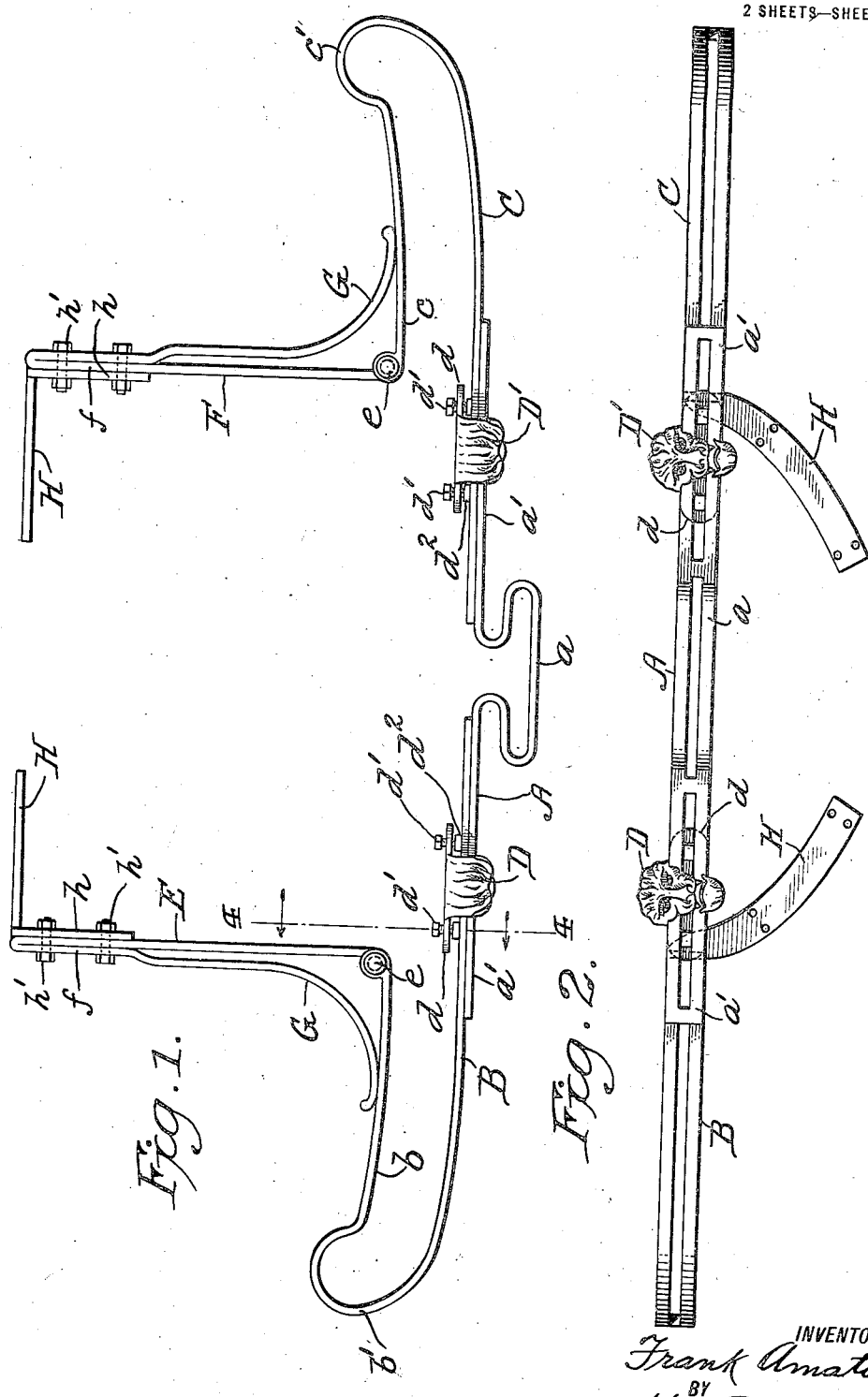

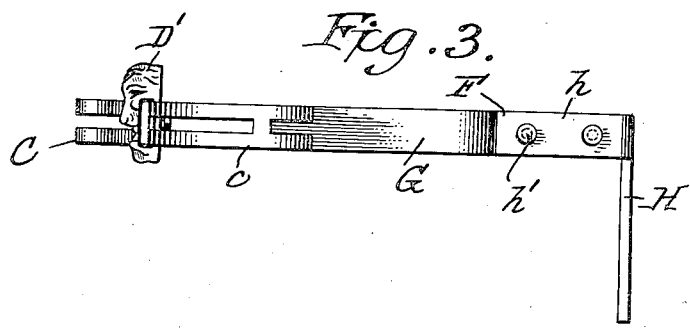
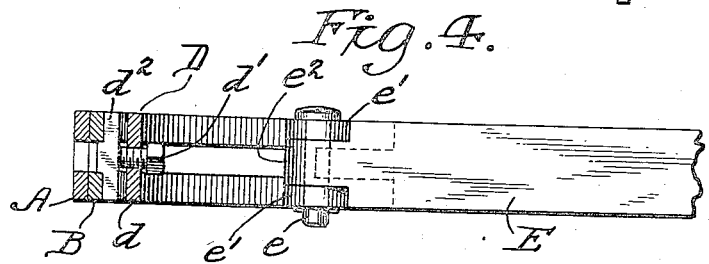
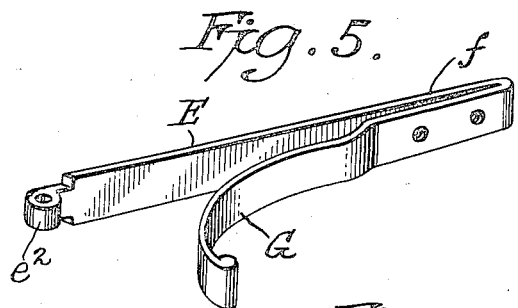
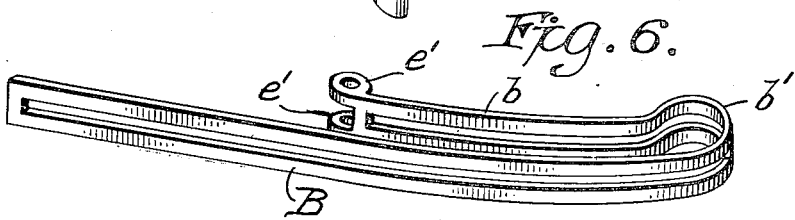
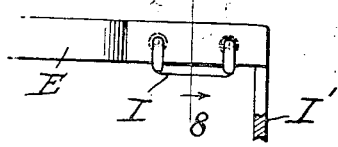
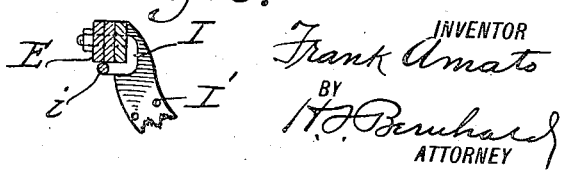

FRANK AMATO, OF LONG ISLAND CITY, NEW YORK.

AUTOMOBILE BAR-BUMPER.

1,313,043.  Specification of Letters Patent.  Patented Aug. 12, 1919.

Application filed January 24, 1918. Serial No. 213,490.

*To all whom it may concern:*

Be it known that I, FRANK AMATO, a subject of the King of Italy, and a resident of Long Island City, county of Queens, and State of New York, have invented a certain new and useful Automobile Bar-Bumper, of which the following is a specification.

This invention is a bumper for use upon automobiles with a view to minimizing the shock and jar when a motor-driven vehicle strikes an object in its path.

Among other objects, my invention seeks to secure a yielding or spring action in the bumper, thus obtaining a cushion effect when in contact with an obstacle; to provide for a variation in the length of the bumper whereby it may be used on different makes of automobiles, the width of which varies within certain limits; to provide means for attaching the bumper to the chassis, springs, or other parts of automobiles; to attain a certain degree of ornamentation and thus render the device attractive in appearance, and to simplify the construction so that the bumper is capable of manufacture economically and is efficient and durable in service.

The bumper, in a preferred constructional form comprises a plurality of end members and an intermediate member positioned in lapping relation and connected together by couplings, preferably ornamental in construction, whereby the operative length of the bumper may be varied by moving the end members relatively to the intermediate member so as to adapt the bumper for use on different makes of automobiles or other vehicles.

To secure resiliency in the action of the several members and thus obtain a cushion effect when striking an obstacle, the end members are curved rearwardly and the intermediate member is doubled or looped upon itself, whereby either member is constructed to yield or give should either member meet with resistance or the bumper as a whole may in like manner yield to an obstacle.

The bumper is mounted by pivoting the rearwardly doubled portions of its end members to a pair of hangers, each hanger being composed of metal doubled upon itself and with a free end portion bent to form a spring which extends laterally from the pivotal connection and is positioned rearwardly of the doubled portion of the end member for contact therewith should the end member be pressed backwardly, whereby the spring portions of the two hangers afford stiffness to the end members and enables the latter to resist undue pressure tending to displace the bumper. Said hangers thus provide a pivotal and spring supporting means for the bumper, proper, and said hangers are adapted to be attached to a suitable part of the vehicle either by the use of brackets or by the aid of clip or yoke bolts, as may be preferred.

Other features and advantages of the invention will appear from the following description taken in connection with the drawings, wherein—

Figure 1 is a plan view of my bumper.

Fig. 2 is a front elevation thereof.

Fig. 3 is an end elevation.

Fig. 4 is a cross section on the line 4—4 of Fig. 1.

Fig. 5 is a detail perspective view of one of the hangers.

Fig. 6 is a detail perspective view of one of the end members.

Fig. 7 is a detail view in elevation of another means for attaching one hanger to a part of the vehicle, and Fig. 8 is a cross section on the line 8—8 of Fig. 7.

The bumper or fender comprises members A B C arranged relatively to each other, as indicated substantially in Figs. 1, 2 and 3 of the drawings. It is preferred to bend, double or loop the member A intermediate its ends, thereby providing a spring portion $a$ and arms $a'$ extending in opposite directions from said spring portion, although I would have it understood that the invention is not limited to a member A doubled to form the spring portion $a$, for the reason that said member A may be a straight bar or rod.

Members B C are positioned in lapping relation to the straight arms $a'$ of the intermediate member A. Said members B C are bent rearwardly of the operative length of the fender or bumper so as to produce the arms $b$ $c$ and the loops $b'$ $c'$, see Fig. 1, whereby the operative portion of the fender is constructed to secure a spring action in each of its members A B C.

D D' designate couplings, preferably of an ornamental character, and fitted to embrace the members A B C at the lapping portions thereof, said couplings operating to separably unite the members B and C to the member A in a manner to provide for the ready disengagement of one member from the other and to enable the members B and C to be extended with respect to the member A. Said construction allows the parts of the fender to be separated in order to arrange them compactly for shipment or storage, and the construction specified is advantageous, also, for the reason that the operative length of the fender can be varied to adapt the device to different makes of automobiles, the width of which may and does vary within certain limits.

As shown, each coupling D or D' is made ornamental on its front exposed portion by imparting thereto the appearance of a lion's head, see Figs. 1, 2 and 3, but it is obvious that any other desired ornamentation may be given to the exposed part of the coupling, and, further, that each coupling may be of a plain non-ornamental character. At the rear part of each coupling is a plate $d$ provided with screw-threaded apertures for the reception of binding screws $d'$, said screws operating upon clamping plates $d^2$ which are positioned intermediate the back plate $d$ and one of the members at the point where said member overlaps another member, as clearly illustrated in Figs. 1 and 4. The clamping plates $d^2$ are constructed to fit snugly to the slotted members A B or C, as illustrated by Fig. 4, wherein plate $d^2$ is shown having a web thereof fitted within a slot of the member B. Said plates afford substantial points of contact for the binding screws so that the coupling will operate efficiently in rigidly connecting the members in the desired operative relation thereof.

The rearwardly extending portions $b$ $c$ of the end members B C are attached to hangers E F, it being preferred to pivotally attach said rearwardly extending portions $b$ $c$ of the members B C to the hangers by means of bolt or pins $e$. As shown in Fig. 6, each member B or C is composed of a bar or rod of metal, the rear portion of which is formed with spaced eyes $e'$ adapted to embrace an eye $e^2$ of one hanger, thus making provision for the insertion of the pivotal pin or bolt $e$ through the alined eyes $e'$ $e^2$ of one member and the hanger complemental thereto. Each hanger E or F is composed, preferably, of a rod or bar of metal bent to the shape shown in Fig. 5, thus producing a spring arm G. It will be understood that each hanger E or F is composed of a rod or bar doubled upon itself, as at $f$, and producing two lengths, one of which is provided with the eye $e^2$ and the other of which is bent laterally to produce the spring G. The hangers extend at a right angle to the operative length of the bumper or fender and are positioned rearwardly thereof, said hangers being attached to the rearwardly position of the end members, and the springs G of said hangers being in contact with said rearwardly positioned portions $b$ $c$, as clearly shown in Fig. 1, whereby the springs G afford additional spring resistance to the rearward movement of the bumper when it comes forcibly into contact with an obstacle in the path of the car.

Suitable means are provided for mounting the hangers on the chassis, the springs, or other part of an automobile. In some instances I may employ the angle brackets H, each having an end portion $h$ thereof fitted into contact with the double terminal portion $f$ of one hanger, whereby bolts $h'$ may be passed through suitable openings provided in the brackets and in the doubled parts of the hangers so as to rigidly attach said hangers to the brackets. It is not desired, however, to limit the invention to the use of the angle brackets H, for the reason that I may employ the double clip bolt I shown in Figs. 7 and 8. The bolt I is in the shape of a clip having two threaded arms which are insertible through the openings in the doubled part $f$ of the hanger, said clip having a cross member $i$ adapted to be positioned below the hanger and to fasten the latter securely to a part I' of an automobile.

It may be stated that each member A B C of the bumper can be economically produced from rod or bar metal. The several parts composing the bumper can be readily mounted upon the chassis, springs or other parts of an automobile. The bumper is efficient in service, for the reason that it affords a spring cushion when it strikes an obstacle in the path of the car, thus minimizing the tendency to injury and breakage.

It will be noted that the arms $a'$ of member A are positioned in front of the inner ends of the end members B, C, but it is preferred to reverse the relative positions of these lapping portions of the members, i. e. by bringing the arms $a'$ of member A into contact rearwardly of the inner ends of members B, C, thereby securing an increased spring action of the bumper as a whole.

In a preferred form of my invention each member A, B, C, as well as the hangers D, E, are composed of rod metal bent to the required form.

The use of a middle member as A separate from end members B, C provides a bumper wherein each member is capable of a spring action, as well as making provision for a variation in the operative length of the bumper.

Having thus fully described the invention, what I claim as new, and desire to secure by Letters Patent is:

1. A bumper comprising a plurality of members positioned in overlapping relation, means for coupling a plurality of the members at the overlapping portions of said members, the end members being provided with rearwardly extended portions, and hangers each comprising yieldable arms, one arm being pivotally connected with a rearwardly extended portion of an end member and the other arm positioned in contact with said end member at a point remote from the pivotal connection.

2. A bumper embodying a yieldable intermediate member, a plurality of end members positioned in lapping relation to said intermediate member, couplings embracing the lapping portions of said members for separably connecting the same and retaining the members normally in fixed relation one to the other, and a hanger having pivotal connection with each end member, said hangers having yieldable arms to limit the movement of the end members.

3. A bumper comprising an intermediate member doubled upon itself to constitute a spring, a plurality of other members positioned in lapping relation to free portions of said intermediate member, and couplings embracing said lapping portions of the members, the doubled portion of said intermediate member being substantially free from contact with said couplings and the lapping portions of said other members.

4. A bumper comprising an intermediate member doubled or looped to produce a spring intermediate the end portions of said member, a plurality of end members each having a part thereof positioned in lapping relation to an end portion of said intermediate member, and couplings embracing the lapping portions of said intermediate and end members.

5. A bumper comprising a plurality of slotted members assembled into lapping relation, couplings embracing the lapping portions of said members, binding screws supported in said couplings, and clamping plates in contact with the members and having portions thereof positioned within the slots to afford points of contact for said screws.

6. A bumper comprising a plurality of members, two of which are doubled rearwardly with respect to the operative portion of the bumper, hangers each having a plurality of arms, one of which is pivotally connected to said doubled portion of a member and another arm to yieldingly contact with the doubled portion of a member, and brackets for mounting said hangers, said brackets engaging a plurality of hanger arms.

7. A bumper comprising a plurality of members two of which are doubled rearwardly with respect to the operative portion of the bumper, and hangers each provided with a spring positioned in coöperative relation to said rearwardly extending portions of the members.

8. A bumper comprising a plurality of members two of which are doubled rearwardly with respect to the operative portion of the bumper, hangers pivotally connected to said rearwardly extending portions of the members, and spring members contacting with said rearwardly extending portions and affording yielding resistances to displacement of the bumper.

9. A bumper the end portions of which are extended rearwardly with respect to the operative part of the bumper, hangers pivoted to said rearwardly extended end portions, spring members supported by the hangers for contact with said rearwardly extended end portions, and means for supporting said hangers.

10. A bumper the end portions of which are doubled rearwardly with respect to the operative part of said bumper, a plurality of hangers each provided with a spring member, said hangers being attached to the rearwardly positioned portions of the bumper and the spring members of said hangers arranged for contact with said bumper, and means for attaching said hangers in fixed positions.

In testimony whereof I have hereunto signed my name.

FRANK AMATO.